US012655874B2

(12) United States Patent
Sevagen et al.

(10) Patent No.: US 12,655,874 B2
(45) Date of Patent: Jun. 16, 2026

(54) SYSTEM FOR COUPLING TWO SHAFTS IN ROTATION WITHOUT PLAY

(71) Applicant: SAFRAN ELECTRONICS & DEFENSE, Paris (FR)

(72) Inventors: Bertrand Sevagen, Moissy-Cramayel (FR); Franck Alexandre, Moissy-Cramayel (FR); Etienne Merlet, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 222 days.

(21) Appl. No.: 18/690,959

(22) PCT Filed: Sep. 13, 2022

(86) PCT No.: PCT/FR2022/051720
§ 371 (c)(1),
(2) Date: Mar. 11, 2024

(87) PCT Pub. No.: WO2023/041866
PCT Pub. Date: Mar. 23, 2023

(65) Prior Publication Data
US 2024/0376937 A1      Nov. 14, 2024

(30) Foreign Application Priority Data
Sep. 15, 2021    (FR) ...................................... 2109676

(51) Int. Cl.
*F16D 1/112*          (2006.01)
(52) U.S. Cl.
CPC .................................... *F16D 1/112* (2013.01)
(58) Field of Classification Search
CPC .......... F16B 7/1481; F16B 7/20; F16B 21/16; F16B 21/18; F16D 1/10; F16D 1/108;
(Continued)

(56) References Cited

U.S. PATENT DOCUMENTS 3,108,669  A  *  10/1963   Ateliani .................. F16D 55/02
                                                    192/223.3
3,249,180  A  *   5/1966   Torossian .............. F16B 7/1481
                                                    192/81 R
(Continued)

FOREIGN PATENT DOCUMENTS

DE          1911322  A1  *  9/1970   ............ F16B 7/1481
EP          0791758  A1  *  8/1997   ................ F16B 7/20
(Continued)

OTHER PUBLICATIONS

International Search Report mailed Nov. 30, 2022, issued in corresponding International Application No. PCT/FR2022/051720, filed Sep. 13, 2022, 6 pages.
(Continued)

*Primary Examiner* — Josh Skroupa
(74) *Attorney, Agent, or Firm* — CHRISTENSEN O'CONNOR JOHNSON KINDNESS PLLC

(57)          ABSTRACT

A system couples a driving shaft and a driven shaft in rotation and without play. The driving shaft includes a tubular end with at least one internal longitudinal groove receiving the driven shaft and having at its end a projecting cylindrical transverse pin configured to engage in the groove. A return spring for the pin urges the pin without play against a longitudinal edge of the groove. The spring includes a first helical section for fastening to the driven shaft and threaded by screwing through the pin. A second section of the spring bears on the pin, and a third elastic return section of the spring acts elastically on the second section.

10 Claims, 5 Drawing Sheets

(58) Field of Classification Search

CPC . F16D 1/112; F16D 1/116; F16D 3/06; F16D 3/2052; F16F 1/047; Y10T 403/32991; Y10T 403/60; Y10T 403/7005; Y10T 403/7007; Y10T 403/7032; Y10T 403/7033

USPC ........ 464/112, 169; 403/166, 326, 348, 349, 403/359.4, 359.5; 267/180

See application file for complete search history.

(56) References Cited

U.S. PATENT DOCUMENTS

| | | | | |
|---|---|---|---|---|
| 4,247,216 | A | 1/1981 | Pansini | |
| 4,907,336 | A * | 3/1990 | Gianturco | B21F 45/008 |
| | | | | 267/180 |
| 4,943,182 | A * | 7/1990 | Hoblingre | F16D 1/108 |
| | | | | 403/349 |
| 5,496,323 | A * | 3/1996 | Dye | F16B 7/20 |
| | | | | 403/348 |
| 5,909,791 | A * | 6/1999 | DiStefano | F16F 1/06 |
| | | | | 267/167 |
| 8,197,155 | B2 * | 6/2012 | Noh | H01R 13/625 |
| | | | | 403/348 |
| 2003/0231927 | A1 * | 12/2003 | Hale | B08B 9/045 |
| | | | | 403/349 |
| 2008/0146429 | A1 | 6/2008 | Woodman | |
| 2010/0260537 | A1 | 10/2010 | Qin | |
| 2016/0348730 | A1 | 12/2016 | Newth | |

FOREIGN PATENT DOCUMENTS

| | | | | |
|---|---|---|---|---|
| FR | 2 628 488 A1 | 9/1989 | | |
| FR | 2745610 A1 * | 9/1997 | .............. | F16B 7/20 |
| JP | S6159021 A | 3/1986 | | |

OTHER PUBLICATIONS

Written Opinion mailed Nov. 30, 2022, issued in corresponding International Application No. PCT/FR2022/051720, filed Sep. 13, 2022, 4 pages.

* cited by examiner

SYSTEM FOR COUPLING TWO SHAFTS IN ROTATION WITHOUT PLAY

TECHNICAL FIELD OF THE INVENTION

The invention relates to a system for coupling two shafts in rotation without play, in particular between a shaft of a member of an aircraft and a driven shaft of a sensor of this aircraft, such as an sensor for measuring the angular rotation of the member.

TECHNICAL BACKGROUND

The prior art comprises the documents JPS.61.59021-A, U.S. Pat. No. 4,247,216-A, FR-2.628.488-A1, US-2008/146.429-A1, US-2016/348.730-A1 and US-2010/260.537-A1.

The aircrafts, both civil and military, carry on board a large number of angular position sensors, also referred to as resolvers. These sensors can be put to many uses in different systems, such as measuring the angular position or the angular speed of an aerodynamic flap, a member for controlling the cockpit, or any angular actuator or other member subject to an angular movement, such as a door of a discharge system of a turbomachine of the aircraft, or similar.

The highly constrained environments in which these aircraft operate require the use of particularly reliable resolvers. For this purpose, sensors of the RVDT type (Rotary Variable Differential Transformer) are frequently chosen, which are active, inductive electrical sensors for rotational displacement, more reliable and accurate than encoder wheel sensors.

Such a sensor comprises a shaft whose angular position can be accurately determined relative to a housing of the sensor.

A problem arises when it comes to coupling the shaft of the sensor with that of the member whose angular position is to be determined.

For such a coupling, it is desirable to have a totally rigid connection for the axial rotation for the angular reading accuracy, and effortless freedom of movement in the other five degrees of freedom using a "dog coupling".

This coupling consists of providing a shaft referred to as the "driving" shaft of the member whose angular position is to be determined, with a tubular end having an inner wall equipped with at least one longitudinal groove or opening.

This tubular end accommodates the shaft of the sensor, or "driven shaft", which is smaller in diameter than the tubular end of the driving shaft, and which comprises at its end a projecting cylindrical transverse pin which is able to penetrate the groove and cooperate with a longitudinal edge of said groove so that the driving shaft drives the driven shaft.

Elastic return means for returning the pin are arranged between the driving shaft and the pin, and are configured to urge the pin without play against the longitudinal edge of the groove.

Typically, these elastic means comprise a spring comprising a first strand attached to the driving shaft, and a second strand extending from this first strand and urging the pin. The first strand is, for example, a circular strand wound in a slot in the driving shaft and the second strand is shaped like an herringbone, one of the branches of which is an extension of the first strand and a second branch of which urges directly on the pin.

This type of spring poses a problem in terms of the accuracy of the force provided by the spring, as the first strand both ensures an attachment function to the driving shaft and an elastically return function for returning the second strand. As a result, the connection between the two shafts creates a quasi-rigid coupling between the driving shaft and the driven shaft, which disturbs the information received by the shaft of the sensor. A coupling that is too rigid may be capable of transmitting mechanical stresses, to which the member is subjected, to the driven shaft of the sensor, but also to the driving shaft, and in particular undesired mechanical stresses such as transverse forces, torques orthogonal to the measuring torque, or vibrations. These mechanical stresses are likely to distort the sensor measurement or interfere with the correct operation of the driving member. On the other hand, no separation of the driving and driven shafts is acceptable.

There is therefore a real need for a "dog coupling" in which the elastic return means for returning the pin are sufficiently flexible and have a non-complex operating mode to avoid such transmissions, these elastic means allowing, in terms of reproducibility and stability, a control of the torque useful for the measurement as well as the torque induced on the driving member.

SUMMARY OF THE INVENTION

The invention allows to achieve this result by proposing a system for coupling two shafts in rotation without play, in particular in an aircraft, comprising successively:
- a driving shaft, one tubular end of which has an inner wall equipped with at least one longitudinal groove,
- a driven shaft, with a diameter smaller than an internal diameter of the tubular end of the driving shaft, comprising at its end a projecting cylindrical transverse pin able to penetrate into the groove and to cooperate with a longitudinal edge of said groove so that the driving shaft drives the driven shaft,
- elastic return means for returning the pin, arranged between the driving shaft and the pin, configured to urge the pin without play against the longitudinal edge of the groove, characterised in that it comprises a return spring, comprising:
- a first helical attachment section, of a diameter corresponding to that of the driven shaft, turns of which are wound in a first orientation, and configured so as to be threaded around the driven shaft through the pin with a sliding or uncertain type of adjustment around said driven shaft,
- a second section for changing the winding orientation of the turns, comprising a wire segment capable of bearing on the pin, and
- a third elastic return section, comprising at least one helical portion, extending the second section, turns of which are wound in a second orientation opposite to the first orientation, said helical portion having a winding diameter greater than the diameter of the driven shaft, said third section further comprising means for bearing said third section in the tubular end of the driving shaft, and being capable of elastically urging the second section to form the elastic return means for returning the pin.

Advantageously, the return spring according to the invention allows to decouple the play-free attachment function of the spring from the elastic return function of the pin by distributing these functions over two different strands of the spring. The result is a more flexible return spring that prevents the transmission of parasitic forces and vibrations to the driven shaft of the sensor.

According to another characteristic of the invention, the turns of the first section are wound with a pitch close to a diameter of the pin and less than said diameter of the pin, the pitch preferably being less than the diameter of the pin by at most 10% of the diameter of said pin so that the separation of said turns of the first section by the pin, when screwing said first section around the driven shaft through said pin, does not urge said first section or only urges it within its elastic deformation range.

The geometry of this first section means that the spring can be captively mounted on the driven shaft without play.

According to other characteristics of the invention:

the second section and junction ends of the first and third sections with the second section determine a U-shaped link bar trapping the pin in order to immobilise the spring in axial translation with respect to the driven shaft and in rotation about said driven axis, the means of bearing the third section in the tubular end of the driving shaft comprise a substantially rectilinear terminal strand of the third section, extending the helical portion of said third section, which is received in a longitudinal slit in the tubular end of the driving shaft, the turns of the helical portion of the third section are preferably close together without being joined, so as not to generate friction between said turns over the working range of the spring.

the helical portion of the third section advantageously comprises no more than 3 turns, the first helical attachment section has a length of between twice and three times a diameter of the driven shaft, the transverse pin projects on either side of the driven shaft.

The invention also relates to an aircraft comprising a coupling system of the type described above, the driving shaft of which is a shaft of a member of said aircraft, and the driven shaft of which is a shaft of a sensor for measuring the angular position or speed of the member.

The invention also relates to a method for assembling a coupling system of the type described above, characterised in that it comprises:

a first step during which the first section of the spring is screwed onto the driven shaft by passing the pin between the turns of said first section, a second step during which, as the screwing continues, the first section escapes from the pin and the pin is then trapped in the U-shaped link bar.

a third step during which the driven shaft equipped with the spring is pushed towards the tubular end of the driving shaft until the pin is located in the longitudinal groove of the driving shaft and the straight strand of the spring penetrates the slit in the tubular end of the driving shaft, at least a portion of the first section of the spring being outside the tubular end of the driving shaft, an axis of the driven shaft not coinciding with the axis of the driving shaft, a fourth step during which a radial translation movement is carried out between the driving shaft and the driven shaft to align the driven shaft and the driving shaft and to tension the third elastic return section of the spring, a fifth step during which the driven shaft is axially pushed into the end of the driving shaft while maintaining the alignment of the driving and driven shafts in order to axially arrange the driven shaft in a definitive position.

In the more particular context of coupling the driving shaft of an aircraft member to a driven shaft of a sensor of this aircraft, the invention relates to a method of the type described above, in which the first and second steps form a first phase of equipping a displacement sensor comprising the driven shaft, in which the third to sixth steps form a second phase of coupling the driven shaft of the sensor to the driving shaft, and in which the method comprises a sixth step during which the sensor is attached.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

In the following description, identical reference numbers refer to identical or with similar functions parts.

Figure 1:
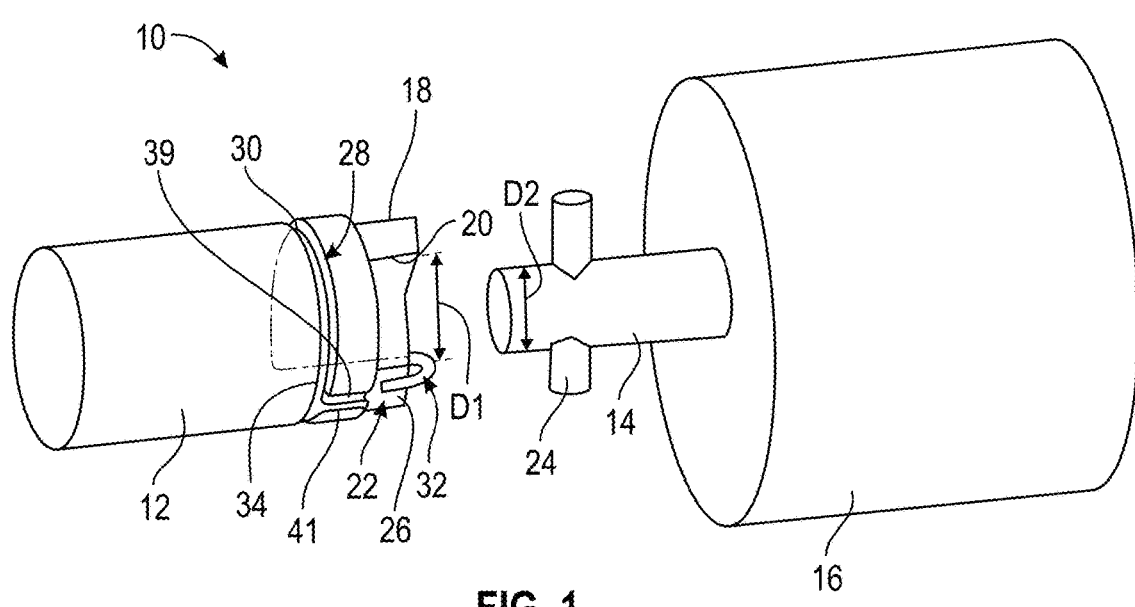
FIG. 1 is a partially exploded perspective view of a coupling system without play according to the prior art.

FIG. 1 shows a system 10 for coupling in rotation two shafts without play. Such a system 10 is used in particular in an aircraft for coupling the shaft 12 of a member of the aircraft to a shaft 14 of an angular displacement sensor 16 such as an RVDT type sensor (Rotary Variable Differential Transformer), which is an active and inductive electrical sensor of rotational displacements. However, such a coupling system could be used for another purpose.

The member of the aircraft may be a motor for controlling a flap of a flight control surface, an actuator of a discharge door for a turbomachine, an actuator for the angular inclination of the blades of a variable-pitch propeller, a control member of the cockpit of the aircraft or any other rotary actuator that can be implemented in an aircraft and whose position or angular speed needs to be accurately known.

The system 10 comprises the driving shaft 12, one tubular end 18 of which has an inner wall 20 equipped with at least one longitudinal groove 22. In FIG. 1, a view showing only half of the tubular end 18 passing through the plane of the groove 22 has been produced to make the groove visible. The groove 22 may or may not pass radially through the wall 20 of the tubular end 18, and therefore may or may not be open.

The system 10 comprises the driven shaft 14, a diameter D2 of which is smaller than an internal diameter D1 of the tubular end 18 of the driving shaft 12.

Figure 2:
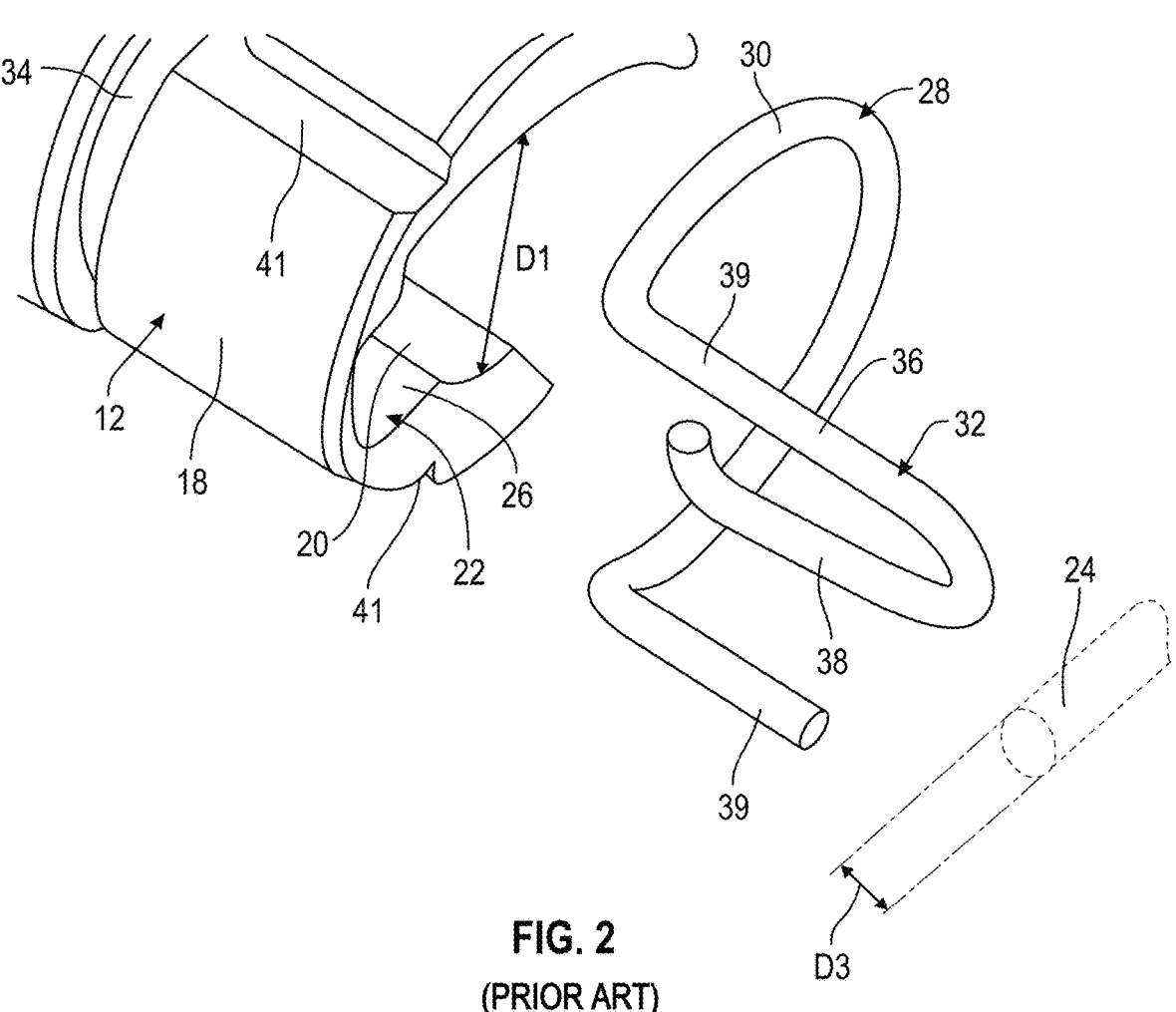
FIG. 2 is an exploded perspective detail view of the driving shaft and elastic return means for returning the pin of the system shown in FIG. 1.

At its end, the driven shaft 14 comprises a projecting cylindrical transverse pin 24 capable of penetrating into the groove 22 and cooperating with a longitudinal edge 26 of this groove so that the driving shaft 12 drives the driven shaft 14. FIGS. 1 and 2 show pin 24 facing the groove 22.

In FIG. 1, the pin 24 projects from both sides of the axle 14, and as such comprises a projection on each side of the axle, but it will be understood that this configuration is not restrictive of the invention.

Finally, the system 10 comprises elastic return means 28 for returning the pin, arranged between the driving shaft 12 and the pin 24, which are configured to urge the pin 24 without play against the longitudinal edge 26 of the groove 22.

Conventionally, as illustrated in FIGS. 1 and 2, these elastic means consist of a spring 28 comprising a first strand 30 attached to the driving shaft, and a second strand 32, derived from this first strand, urging on the pin 24. The first strand 30 is a circular strand wound in a slot 34 in the driving shaft 12. It is immobilised there by being extended by an axial tab 39 which is received in another external groove 41 in the tubular end 18 of the driving shaft 12. The second strand 32 is in the form of a herringbone, one of the branches 36 of which extends the first strand 30 and a second branch 38 of which urges the pin 24 directly against the longitudinal edge of the groove 22. To this end, the pin 24 has a diameter D3 smaller than a width of the groove 22, the second strand 32 and the pin 24 being received in the groove 22.

This type of spring poses a problem of precision in terms of the stiffness implemented, as the first strand 30 performs both an attachment function on the driving shaft and a return elastic function for returning the second strand 32. As a result, it has a complex operation due to the combination of these two functions. As a result, the connection between the two shafts 12, 14 creates a quasi-rigid coupling between the driving shaft 12 and the driven shaft 14, which disturbs the information received by the shaft of the sensor. A coupling that is too rigid may be capable of transmitting to the driven shaft 14 of the sensor 16 the parasitic stresses and vibrations to which the member is subjected, and thus of distorting the measurement of the sensor 16.

The invention remedies these disadvantages by proposing a more flexible spring with a non-complex operating mode, i.e. one in which the function of attachment to a shaft and the function of elastic return for returning the pin 24 are decoupled.

Figure 3:
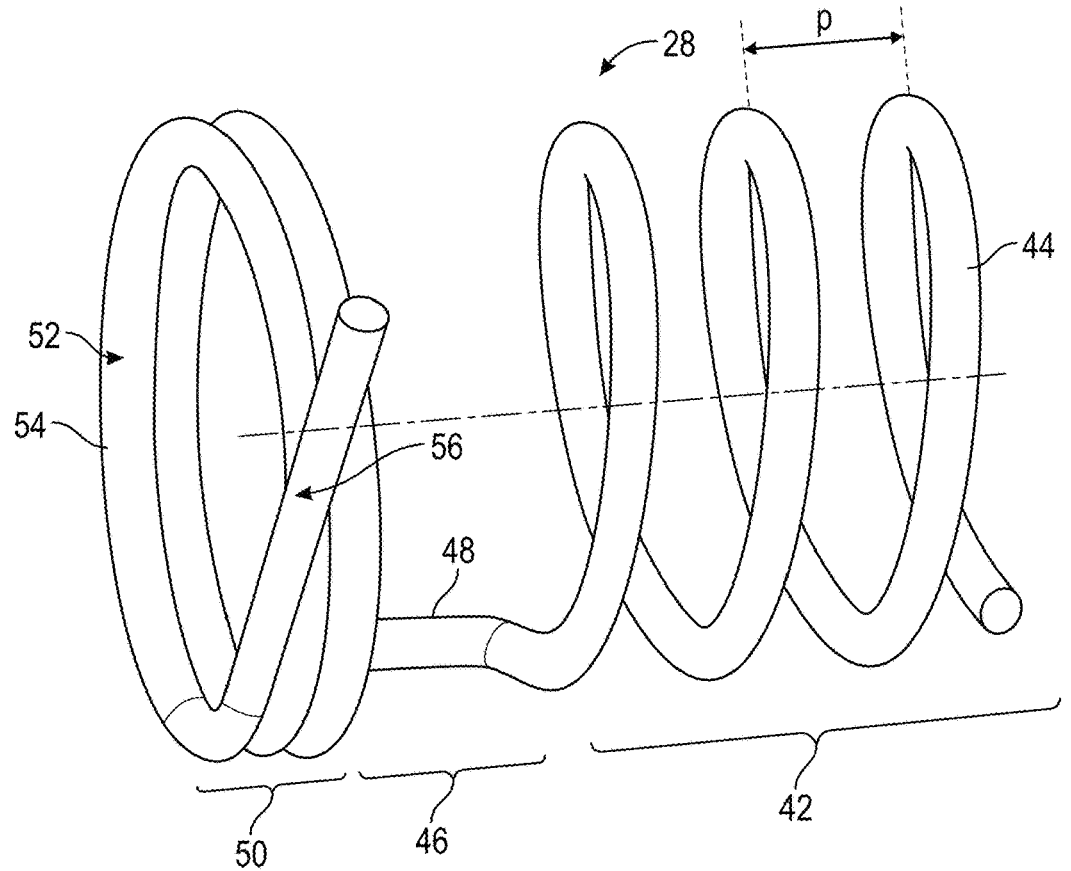
FIG. 3 is a perspective view of a spring for a coupling system without play according to the invention.

Such a return spring 28 is shown in FIG. 3. As illustrated in FIG. 3, the spring 28 comprises a first helical attachment section 42, the turns 44 of which are wound in a first orientation. This first section 42 is configured to be threaded around the driven shaft 14 through the pin 24.

To this end, the turns 44 of the first section 42 are wound with a pitch p close to the diameter D3 of the pin 24 and less than said diameter of the pin 24. For example, the pitch p is less than the pin diameter by a maximum of 10% of the pin diameter.

The pitch p is determined so that the separation of the turns 44 of the first section 42 by the pin 24, when this first section 42 is screwed onto the driven shaft 14, does not urge this first section 42 or only urges it within its elastic deformation range. When the spring 28 is screwed in, the first section 42 distorts as it is screwed through the pin 24, but remains within its elastic deformation range so that its mechanical characteristics are not altered. Once the first section 42 has passed the pin 24, the first section 42 straightens out with its axis coinciding with that of the driven shaft 14.

Figure 4:
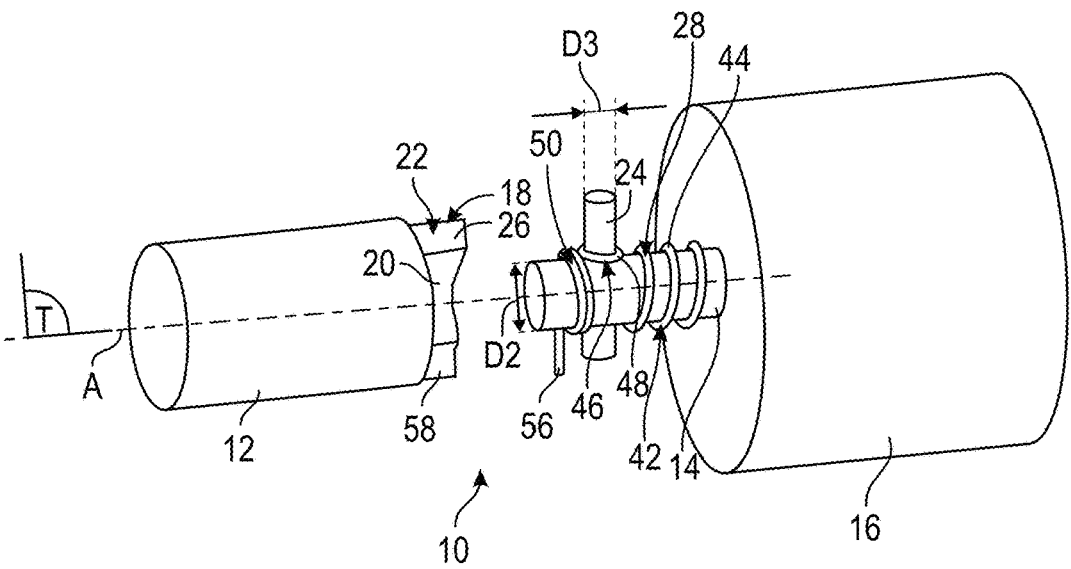
FIG. 4 is a partially exploded perspective view of a coupling system without play according to the invention.

Preferably, the first helical attachment section 42 is between twice and three times as long as a diameter D2 of the shaft 14 shown in FIG. 4.

Figure 5:
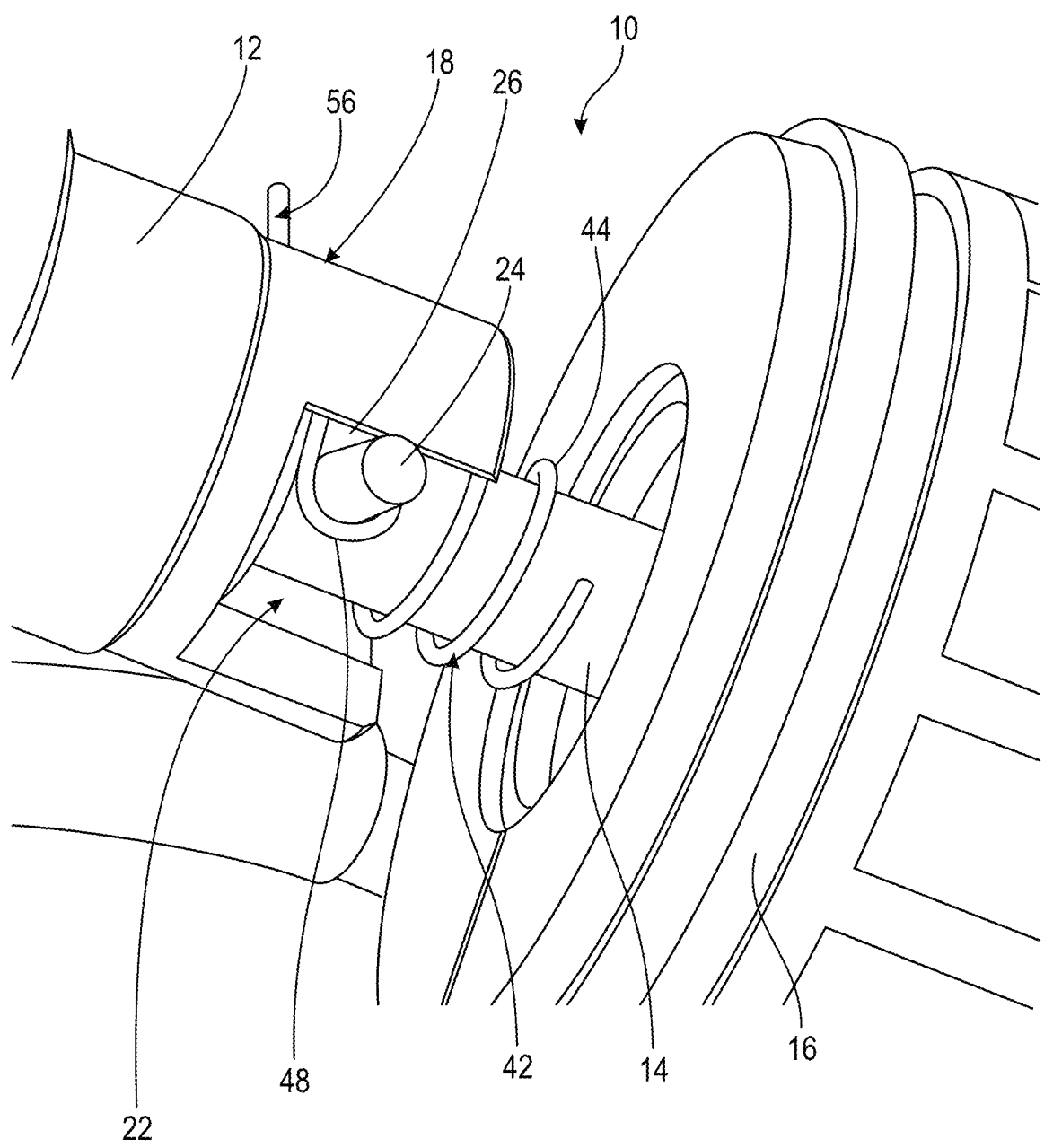
FIG. 5 is a perspective view of the coupling system without play according to the invention, assembled at the level of the cooperation of the spring point with the pin.

As shown in FIG. 3, the spring 28 comprises, adjoined to this first section 42, a second section 46 for changing the winding orientation of the turns, comprising a wire segment 48 capable of bearing on the pin 24, as shown in FIGS. 4 and 5.

Adjoined to this second section 46, the spring 28 also comprises a third elastic return section 50, comprising at least one helical portion 52 which is joined to the second section 46, and whose turns 54 are wound in a second orientation opposite to the first orientation. This third section 50 comprises means 56 for bearing this third section 50 in the tubular end 18 of the driving shaft 12. This third section 50 is capable of elastically urging the second section 46 to form the elastic return means for returning the pin 24.

The bearing means 56 for bearing the third section 50 in the tubular end 18 of the driving shaft can take various forms, without limiting the invention. For example, the third section 50 could be immobilised by wedging in the tubular end 18 of the driving shaft. Preferably, however, these bearing means consist of a substantially straight terminal strand 56 formed at the end of the third section 50. This terminal strand 56 is designed to be received in a longitudinal slit 58 in the tubular end of the driving shaft 12. This configuration is shown in FIG. 4, where it is shown the terminal strand 56 facing the slit 58, and in FIG. 6 where it is shown mounted in the slit 58.

Figure 6:
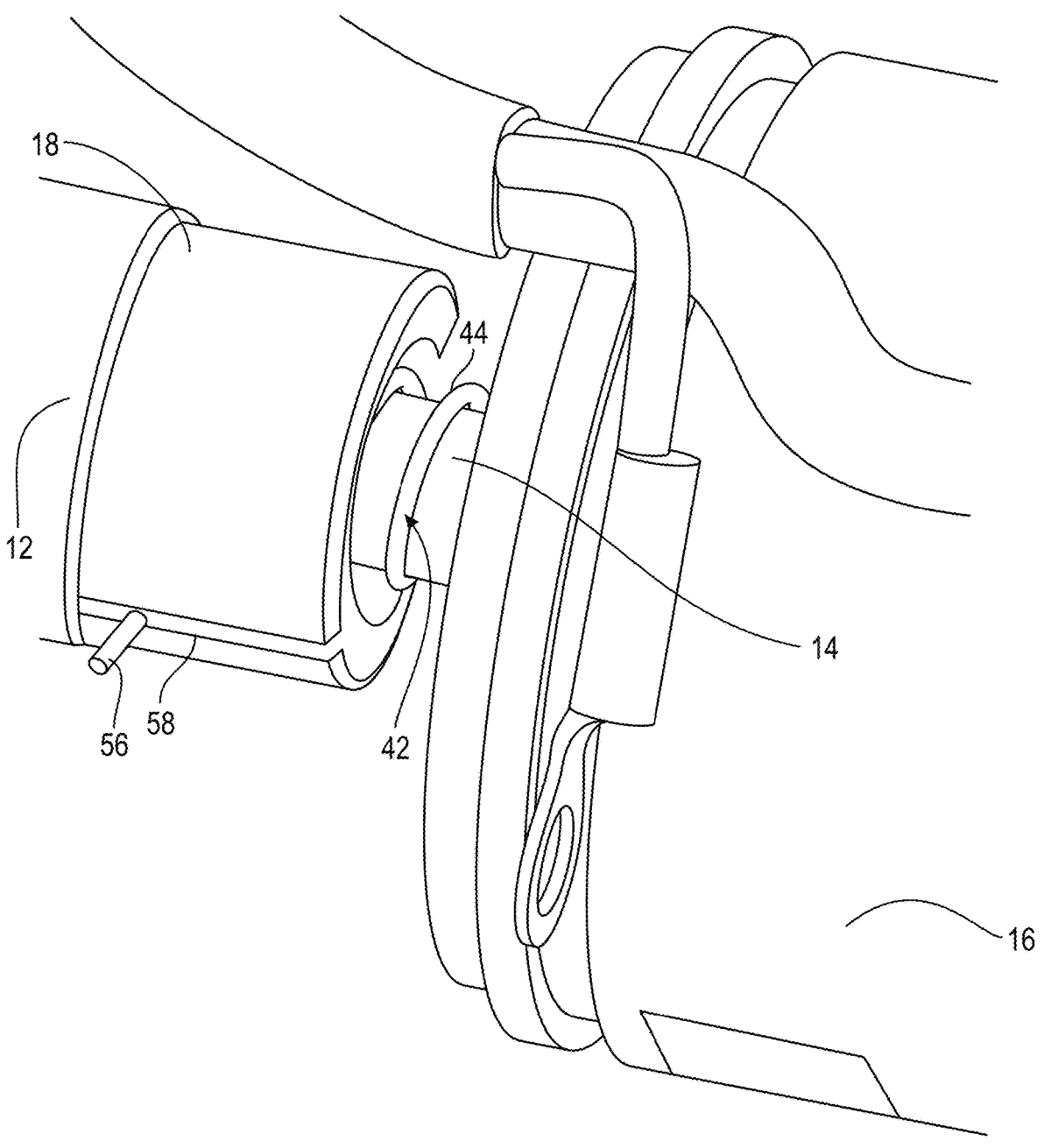
FIG. 6 is a perspective view of the coupling system without play according to the invention, assembled at the level of the bearing of the spring with the driving shaft.

It should be noted that in FIG. 4, the end 22 of the driving shaft 12 has only been partially represented and has been torn off along a plane T passing through an axis A of the driving shaft 12 and through the slit 58, whereas, on the contrary, in FIG. 6, the end 22 of the driving shaft 12 has been represented in its entirety.

The cooperation of the pin 24 with the spring 28 is not limited to the wire segment 48. Advantageously, the second section 46 and the joining ends joining the first and third sections 42, 50 with the second section 46, form and determine a U-shaped link bar trapping the pin 24, as can be seen in FIG. 5. In addition to exerting the return force on the pin 24, this link bar advantageously allows the spring 28 to be immobilised in axial translation relative to the driven shaft 14 and in rotation about this shaft m.

It is sufficient for the transverse pin 24 to project from only one side of the driven shaft 14. However, to secure the mounting of the spring on the driven shaft, the transverse pin 24 projects on either side of the driven shaft. For example, it is mounted with a tightened adjustment in a transverse piercing in the driven shaft 14.

In the case of the third section 50, the turns 54 of the helical portion 52 are preferably close together but not joined in order to avoid creating hysteresis losses caused by the friction of the turns pressed against each other. Non-joining means that there is a non-zero play between two adjacent turns 54.

However, by bringing the turns closer together, it is possible to provide a return force for returning the second section with a minimal axial overall dimension required in the tubular end 18 of the shaft 12. For the same overall dimensions reasons, the helical portion 52 of the third section 50 preferably comprises no more than three turns 54.

Figure 8:
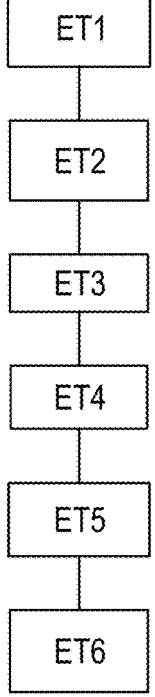
FIG. 8 is a block diagram illustrating the assembly steps of a coupling system according to the invention.

In this configuration, as illustrated in FIG. 8, the coupling system 10 can be assembled according to an assembly method comprising a first step ET1 during which the first section 42 of the spring is screwed onto the driven shaft by passing the pin 24 between the turns 44 of this first section, the first section 42 distorting as it passes through the pin 24. Then, during a second step ET2, the screwing is continued until, as previously mentioned, the first section 42 escapes from a first projection of the pin 24 and the U-shaped link bar captures the opposite second projection of the pin 24, the latter then being housed in the U-shaped link bar, so that the wire segment 48 comes to bear on the pin 24, immobilising the spring 28 in axial translation with respect to the driven shaft 14 and in rotation with respect to this driven shaft 14. The spring, which may have been slightly urged during the first step, has relaxed because it no longer passes through the two opposite projecting portions of the pin 24 but through only one of these portions.

Then, in a third step ET3, the driven shaft 14 is presented in front of the tubular end 18 of the driving shaft 12 and the driven shaft 14 equipped with the spring 28 is pushed towards the tubular end 18 of the driving shaft 12 until the pin 24 is in the correct position on the rib 22 and the straight strand 56 of the spring 28 penetrates the slit 58 in the tubular end 18 of the driving shaft 12.

Then, during a fourth step ET4, a relative radial translation movement is made between the driving shaft 12 and the driven shaft 14 to tension the third section 52 of the spring 28 and align the two driving 12 and driven 14 shafts.

In a fifth step ET5, the driven shaft 14 can then be pushed into the end 18 of the driving shaft 12 while maintaining the third section 52 of the spring 28 under tension, and maintaining the alignment of the driving 12 and driven 14 shafts in order to axially arrange the driven shaft 14 in a definitive axial position.

This method corresponds to the assembly of a coupling system in its most general form.

The invention is of particular interest when it relates more specifically to a coupling system 10, the driving shaft 12 of which is a shaft of a member of an aircraft, and the driven shaft 14 of which is a shaft of a sensor 16 for measuring the angular position or speed of the shaft 12 of said member.

Figure 7:
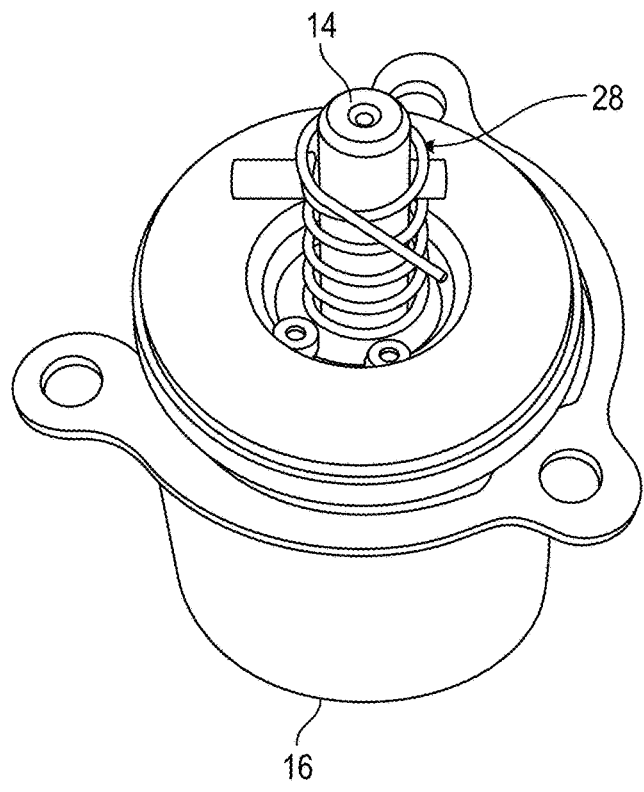
FIG. 7 is a partially exploded perspective view of an angular displacement sensor pre-equipped with a spring according to the invention.

In this case, in particular, the sensor 16 can be supplied pre-equipped with the spring 28. At the end of the second step ET2, the sensor and the spring 28 together can form a pre-equipped sensor 16 which can be considered as a product configuration, as shown in FIG. 7.

In this case, the method previously described can be subdivided into a first phase of pre-equipping the displacement sensor 16 so as to obtain the sensor equipped with the spring 28 on its driven shaft, which corresponds to the first and second steps ET1 and ET2 of the method previously described, then a second phase of coupling the driven shaft 14 of the sensor 16 with the driving shaft 12 of the member, which comprises the third to fifth steps ET3 to ET5 previously described, this second phase further comprising a sixth step during which, having defined the axial position of its driven shaft 14, the elements all being in their final location and able to be attached, the sensor 16 is attached.

The invention therefore considerably improves the reliability of the measurements acquired by this type of sensor 16.

The invention claimed is:

1. A system for coupling two shafts in rotation without play, comprising:
   a driving shaft, one tubular end of which has an inner wall equipped with at least one longitudinal groove,
   a driven shaft, with a diameter (D2) smaller than an internal diameter (D1) of the tubular end of the driving shaft, the driven shaft comprising at an end a projecting cylindrical transverse pin configured to penetrate into the at least one groove and to cooperate with a longitudinal edge of said at least one groove so that the driving shaft drives the driven shaft, and
   elastic return means configured to return the pin, arranged between the driving shaft and the pin, configured to urge the pin without play against the longitudinal edge of the groove,
   the return means comprising a return spring, comprising in succession:
   a first helical attachment section having a diameter corresponding to the diameter of the driven shaft, turns of which are wound in a first orientation, and configured to be threaded around the driven shaft through the pin with a sliding or uncertain type of adjustment around said driven shaft,
   a second section comprising a wire segment configured to bear on the pin, and
   a third elastic return section, comprising at least one helical portion, extending from the second section, turns of which are wound in a second orientation opposite to the first orientation, said third section also comprising means for bearing said third section in the tubular end of the driving shaft, and being configured to elastically urge the second section to form the elastic return means that returns the pin.

2. The coupling system according to claim 1, wherein the turns of the first section are wound with a pitch (p) close to a diameter (D3) of the pin and less than said diameter (D3) of the pin, the pitch (p) being less than the diameter (D3) of the pin by at most 10% of the diameter (D3) of said pin so that the separation of said turns of the first section by the pin, when screwing said first section around the driven shaft through said pin, does not urge said first section or only urges the first section within an elastic deformation range of the first section.

3. The coupling system according to claim 1, wherein the second section and junction ends of the first and third sections with the second section determine a U-shaped link bar trapping the pin, in order to immobilize the spring in axial translation with respect to the driven shaft and in rotation about said driven shaft.

4. The coupling system according to claim 1, wherein the means of bearing the third section in the tubular end of the driving shaft comprise a rectilinear terminal strand of the third section, extending the helical portion of said third section, which is received in a longitudinal slit of the tubular end of the driving shaft.

5. The coupling system according to claim 1, wherein the turns of the helical portion of the third section are not joined.

6. The coupling system according to claim 1, wherein the helical portion of the third section comprises no more than 3 turns.

7. The coupling system according to claim 1, wherein the first helical attachment section has a length of between twice and three times a diameter (D2) of the driven shaft.

8. An aircraft comprising the coupling system according to claim 1, wherein the driving shaft is a shaft of a member of the aircraft, and the driven shaft of which is a shaft of a sensor configured to measure an angular position or speed of the shaft.

9. A method for assembling a coupling system according to claim 2, wherein the second section and junction ends of the first and third sections with the second section determine a U-shaped link bar trapping the pin, in order to immobilize the spring in axial translation with respect to the driven shaft and in rotation about said driven shaft, and the means of bearing the third section in the tubular end of the driving shaft comprise a rectilinear terminal strand of the third section, extending the helical portion of said third section, which is received in a longitudinal slit of the tubular end of the driving shaft, the method comprising:

a first step (ET1) during which the first section of the spring is screwed onto the driven shaft by passing the pin between the turns of said first section, a second step (ET2) during which, by continuing to screw, the first section escapes from the pin and then during which the pin is then trapped in the U-shaped link bar, a third step (ET3) during which the driven shaft equipped with the spring is pushed towards the tubular end of the driving shaft until the pin is placed in the longitudinal groove of the driving shaft and the terminal strand of the spring penetrates the slit of the tubular end of the driving shaft, at least a portion of the first section of the spring being outside the tubular end of the driving shaft, an axis of the driven shaft not coinciding with the axis of the driving shaft, a fourth step (ET4) during which a radial translation movement is carried out between the driving shaft and the driven shaft to align the driven shaft and the driving shaft and to put the third elastic return section of the spring under tension, a fifth step (ET5) during which the driven shaft is pushed into the end of the driving shaft while maintaining the alignment of the driving and driven shafts in order to axially arrange the driven shaft in a definitive position.

10. The method according to claim 9, wherein the first and second steps form a first phase of pre-equipping a displacement sensor comprising the driven shaft, in which the third to fifth steps form a second phase of coupling the driven shaft of said sensor to the driving shaft, wherein the method further comprises a sixth step (ET6) during which the sensor is attached.

\* \* \* \* \*